United States Patent
Ideshio et al.

(10) Patent No.: US 9,132,834 B2
(45) Date of Patent: Sep. 15, 2015

(54) VEHICLE CONTROL APPARATUS

(75) Inventors: Yukihiko Ideshio, Nissin (JP); Terufumi Miyazaki, Toyota (JP); Yuji Inoue, Nissin (JP); Shingo Eto, Gamagori (JP); Yousuke Michikoshi, Miyoshi (JP); Akihiro Sato, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/354,351

(22) PCT Filed: Oct. 27, 2011

(86) PCT No.: PCT/JP2011/006006
§ 371 (c)(1),
(2), (4) Date: Jun. 9, 2014

(87) PCT Pub. No.: WO2013/061373
PCT Pub. Date: May 2, 2013

(65) Prior Publication Data
US 2014/0371965 A1    Dec. 18, 2014

(51) Int. Cl.
| | |
|---|---|
| *B60W 20/00* | (2006.01) |
| *B60K 6/383* | (2007.10) |
| *B60K 6/387* | (2007.10) |
| *B60K 6/48* | (2007.10) |
| *B60K 6/547* | (2007.10) |
| *B60W 10/02* | (2006.01) |

(52) U.S. Cl.
CPC .............. *B60W 20/40* (2013.01); *B60K 6/383* (2013.01); *B60K 6/387* (2013.01); *B60K 6/48* (2013.01); *B60K 6/547* (2013.01); *B60W 10/02* (2013.01); *B60W 20/00* (2013.01); *Y02T 10/6221* (2013.01)

(58) Field of Classification Search
CPC .......... B60K 6/383; B60K 6/387; B60K 6/48; B60K 6/547; B60W 20/40; B60W 10/02; B60W 20/00; Y02T 10/6221
USPC .......................................................... 701/22
See application file for complete search history.

(56) References Cited

U.S. PATENT DOCUMENTS

2007/0278022 A1*  12/2007  Tanishima ................. 180/65.2

FOREIGN PATENT DOCUMENTS

| JP | 2001-200928 A | 7/2001 |
|---|---|---|
| JP | 2002-227883 A | 8/2002 |

(Continued)

*Primary Examiner* — Mary Cheung
*Assistant Examiner* — Yuen Wong
(74) *Attorney, Agent, or Firm* — Gifford, Krass, Sprinkle, Anderson & Citkowski, P.C.

(57) ABSTRACT

To provide a driving system for a vehicle that can fulfill both drivability and regeneration efficiency. The driving system for the vehicle includes: an engine; a motor generator connected to a wheel; a clutch that changes transmission state between a disengagement state in which the engine is disengaged from the motor generator and an engagement state in which the engine is at least slightly engaged with the motor generator; and a one-way clutch capable of transmitting only power in a forward rotational direction from the engine to the motor generator, in which, when the power of the engine is transmitted to the motor generator, a first transmission method for transmitting the power through the one-way clutch with the clutch left disengaged and a second transmission method for transmitting the power through the clutch with the clutch engaged are changed in accordance with a vehicle state.

2 Claims, 10 Drawing Sheets

(56) References Cited

FOREIGN PATENT DOCUMENTS

| | | | |
|---|---|---|---|
| JP | 2003-278807 A | 10/2003 |
| JP | 2004-122879 A | 4/2004 |
| JP | 2008-126703 A | 6/2008 |
| JP | 2010-091100 A | 4/2010 |
| JP | 2011-042207 A | 3/2011 |

* cited by examiner

F I G . 2
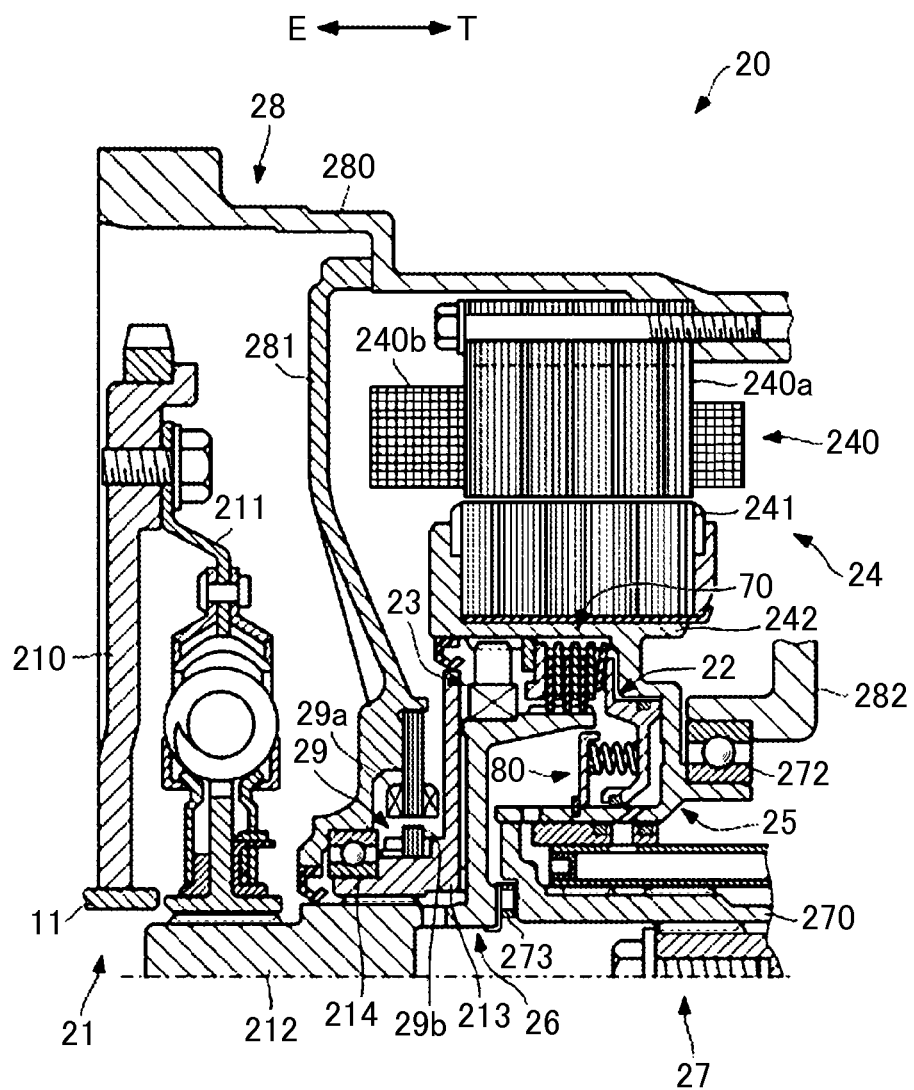

VEHICLE CONTROL APPARATUS

TECHNICAL FIELD

The present invention relates to a vehicle control apparatus.

BACKGROUND ART

In recent years, hybrid vehicles have received attention as environmentally-friendly vehicles such as automobiles. A hybrid vehicle includes an internal combustion engine that is driven with gasoline and the like as fuel (hereinafter, referred to as engine) and an electric motor that is driven by electric power from a battery, as driving power sources.

As shown in FIG. 10, for such type of hybrid vehicle, the vehicle equipped with a driving system 300 formed with an engine 310, a driving unit 320, and a transmission 330 connected in series has been developed (for example, see Patent Document 1). The driving unit 320 includes an electric motor 321, a clutch 322, and a one-way clutch 323.

The electric motor 321 is disposed so as to rotate together with the transmission input shaft 331 of the transmission 330 as one unit. The clutch 322 is disposed between a crankshaft 311 of the engine 310 and the transmission input shaft 331 and changes a transmission state between the engine 310 and the electric motor 321 to a disengagement state and an engagement state. The one-way clutch 323 is disposed between the crankshaft 311 and the transmission input shaft 331 and transmits only power in a forward rotational direction from the engine 310 to the electric motor 321.

In the driving system 300, when the engine 310 is started, the clutch 322 is engaged, the electric motor 321 is driven, and the electric motor 321 cranks to start the engine 310 through the clutch 322. After the engine 310 starts, the clutch 322 is disengaged. Consequently, the output of the engine 310 is transmitted to the transmission 330 only through the one-way clutch 323.

PRIOR ART DOCUMENT

Patent Document

Patent Document 1: Japanese Patent Application Publication No. 2011-42207 (JP 2011-42207 A)

SUMMARY OF THE INVENTION

Problem to be Solved by the Invention

However, in the conventional driving system 300, after the engine 310 starts, the output of the engine 310 is transmitted to the transmission 330 only through the one-way clutch 323. Thus, when the driver release the accelerator pedal, the rotational speed of the crankshaft 311 drops to be less than the rotational speed of the transmission input shaft 331. Therefore, there has been a problem that when the driver depress the accelerator pedal again to re-accelerate, the power of the engine 310 is transmitted to the transmission 330 after the rotational speed of the crankshaft 311 reaches the same rotational speed of transmission input shaft 331, and thus the drivability deteriorates.

On the other hand, when the engagement state of the clutch 322 is kept to focus on the drivability in the conventional driving system 300, there has been a problem that the crankshaft 311 rotates together with the transmission input shaft 331 at the release of the accelerator pedal, and thus regenerative energy cannot be secured enough. Therefore, the fulfillment of both drivability and regeneration efficiency has been demanded.

The present invention is made to solve such a problem, and its object is to provide a vehicle control apparatus that can fulfill both the drivability and the regeneration efficiency.

Means for Solving the Problem

In order to achieve the foregoing object, the vehicle control apparatus according to the present invention includes: an internal combustion engine; an electric motor connected to a wheel; a clutch that changes transmission state between a disengagement state in which the internal combustion engine is disengaged from the electric motor and an engagement state in which the internal combustion engine is engaged with the electric motor; and a one-way clutch capable of transmitting only power in a forward rotational direction from the internal combustion engine to the electric motor, in which, when the power of the internal combustion engine is transmitted to the electric motor, a first transmission method for transmitting the power through the one-way clutch with the clutch left disengaged and a second transmission method for transmitting the power through the clutch with the clutch engaged are changed in accordance with a vehicle state.

According to this structure, control means changes, in accordance with the vehicle state, the first transmission method that focuses on the regeneration efficiency and uses the one-way clutch and the second transmission method that focuses on the drivability and uses the clutch. Therefore, in accordance with the vehicle state, the driving that focuses on either the drivability or the regeneration efficiency can be changed. Consequently, both the drivability and the regeneration efficiency can be fulfilled.

Here, the vehicle state is, for example, various types of information relating to the vehicle such as the rotational speed of the internal combustion engine, the vehicle speed, and the driving that focuses on the power performance of the vehicle or not. The engagement state of the clutch includes the states in which the power is even slightly transmitted by the clutch such as full engagement and half-engagement.

The vehicle control apparatus according to the present invention is characterized in that, the vehicle state is rotational speed of the internal combustion engine, and when the rotational speed of the internal combustion engine becomes greater than a specified value that is determined in advance, the first transmission method is changed to the second transmission method, and the power of the internal combustion engine is transmitted to the wheel through the electric motor.

Here, when the rotational speed of the internal combustion engine is large, the rotational speed of the electric motor also increases during the driving. Thus, when the vehicle is driven with the clutch disengaged, the accelerator pedal is released, and the difference between the rotational speed of the electric motor and the rotational speed of the internal combustion engine increases. Therefore, the drivability may deteriorate when the accelerator pedal is depressed again.

According to the structure of the present invention, in the state in which the rotational speed of the internal combustion engine tends to increase, the clutch is engaged and the driving is changed to that by the internal combustion engine, and consequently, the difference between the rotational speed of the internal combustion engine and the rotational speed of the electric motor can be eliminated, and the drivability can be improved. Additionally, in the state in which the rotational speed of the internal combustion engine does not tend to increase, the clutch can be disengaged, and thus the regeneration efficiency can be improved. Consequently, both the drivability and the regeneration efficiency can be fulfilled.

The vehicle control apparatus according to the present invention is characterized in that, when the vehicle speed becomes greater than a specified value that is determined in advance, the first transmission method is changed to the second transmission method, and the power of the internal combustion engine is transmitted to the wheel through the electric motor.

Here, when the speed stage of the transmission does not change, the vehicle speed increases as the rotational speed of the internal combustion engine is large. Therefore, according to the structure of the present invention, in the state in which the vehicle speed, that is, the rotational speed of the internal combustion engine tends to increase, the clutch is engaged and the driving is changed to that by the internal combustion engine, and thus, the drivability can be improved. When the vehicle speed is not greater than the specified value that is determined in advance, the clutch can be disengaged, and thus the regeneration efficiency can be improved. Consequently, both the drivability and the regeneration efficiency can be fulfilled.

The vehicle control apparatus according to the present invention is characterized in that the vehicle state is whether or not the vehicle is in driving that focuses on power performance operated by the driver, and in the driving that focuses on power performance operated by the driver, the first transmission method is changed to the second transmission method, and the power of the internal combustion engine is transmitted to the wheel through the electric motor.

Here, the driving that focuses on power performance or not means, for example, the responsivity of acceleration by the depressing of the accelerator pedal. Additionally, the driving that focuses on power performance means, for example, the driving with high responsivity of acceleration by the depressing of the accelerator pedal.

According to this structure, during the driving that focuses on power performance, the clutch is engaged and the driving is changed to that by the internal combustion engine, and thus, the drivability can be improved. In the driving that does not focus on power performance, the clutch can be disengaged, and thus the regeneration efficiency can be improved. Consequently, both the drivability and the regeneration efficiency can be fulfilled.

The vehicle control apparatus according to the present invention is characterized in that the driving that focuses on the power performance is: in a case where a driving position operated by the driver is any one of an S-position, an M-position, a 2-position, an L-position, or a B-position, in a case where a driving mode operated by the driver is either of a sports mode or a manual mode, or in a case where depressing speed of an accelerator pedal operated by the driver is faster than the specified value that is determined in advance.

Here, the driving position is applicable in a case where an automatic transmission is provided. The S-position means the sports mode, which is set such that high engine speed is always maintained and cornering control is performed for controlling unnecessary gear change during the cornering, for example. The M-position means a manual position in which the driver selects the speed stage. The 2-position means a second position in which an upper limit of speed change is a second speed. The L-position means a low position in which the speed change is locked in a first speed. The B-position means a brake position in which engine brake is applied.

According to this structure, when any one of the S-position, the M-position, the 2-position, the L-position, or the B-position is selected, the responsivity of acceleration by the depressing of the accelerator pedal can be improved. The responsivity of acceleration by the depressing of the accelerator pedal is often required in a case where any one of the S-position, the M-position, the 2-position, the L-position, or the B-position is selected, and thus the drivability can be improved. When the automatic transmission is in a D-position, the clutch can be disengaged, and thus the regeneration efficiency is improved. Consequently, both the drivability and the regeneration efficiency can be fulfilled.

The driving mode operated by the driver is applied when the automatic transmission is provided and is a speed change program that is separately set from the position of the automatic transmission. The sports mode is set such that high engine speed is always maintained and cornering control is performed for controlling unnecessary gear change during the cornering, for example. In sports mode, even if the shift position of the automatic transmission is maintained in the D-position, sporty driving is enabled. In manual mode, the driver can select the speed stage.

According to this structure, when the driving mode is either of the sports mode or the manual mode, the responsivity of acceleration by the depressing of the accelerator pedal can be improved. The responsivity of acceleration by the depressing of the accelerator pedal is often required, specifically, in a case of either of the sports mode or the manual mode, and thus the drivability can be improved. When the driving mode is not one of the sports mode or the manual mode, the clutch can be disengaged, and thus the regeneration efficiency can be improved. Consequently, both the drivability and the regeneration efficiency can be fulfilled.

When the depressing speed of the accelerator pedal operated by the driver is faster than the specified value that is determined in advance, for example, when the accelerator pedal is suddenly depressed, the responsivity of acceleration by the depressing of the accelerator pedal can be improved. Specifically; when the depressing speed of the accelerator pedal is faster than the specified value that is determined in advance, the responsivity of acceleration by the depressing of the accelerator pedal is often required, and thus the drivability can be improved. When the depressing speed of the accelerator pedal is less than or equal to the specified value that is determined in advance, the clutch can be disengaged, and thus the regeneration efficiency is improved. Consequently, both the drivability and the regeneration efficiency can be fulfilled.

The vehicle control apparatus according to the present invention is characterized in that fuel cut of the internal combustion engine is executed if a stop command of the internal combustion engine is issued when the vehicle is driven with the first transmission method, and the state of the clutch is changed to disengagement and the fuel cut of the internal combustion engine is executed if the stop command of the internal combustion engine is issued when the vehicle is driven with the second transmission method.

According to this structure, when the stop command of the internal combustion engine is issued, the clutch is disengaged and the fuel cut is executed, and thus the generation of vibration can be controlled when the engine torque changes from a positive value to a negative value. Additionally, time to disengage the clutch can be shortened in comparison with the case where the transmission is conducted by only using the clutch in the engagement state without the one-way clutch, and thus the fuel cut can be accelerated. An acceleration in the fuel cut allows the improvement of fuel economy.

Effect of the Invention

According to the present invention, the vehicle control apparatus that can fulfill both the drivability and the regeneration efficiency can be provided.

BRIEF DESCRIPTION OF THE DRAWINGS

FIG. 2 is a schematic diagram that shows a driving unit of the vehicle control apparatus according to the embodiment of the present invention.

MODES FOR CARRYING OUT THE INVENTION

A description will hereinafter be made on preferred embodiments of the present invention with reference to the drawings. This embodiment is designed to apply the present invention to a driving system for a hybrid vehicle.

First, the description is made on its structure.

Figure 1:
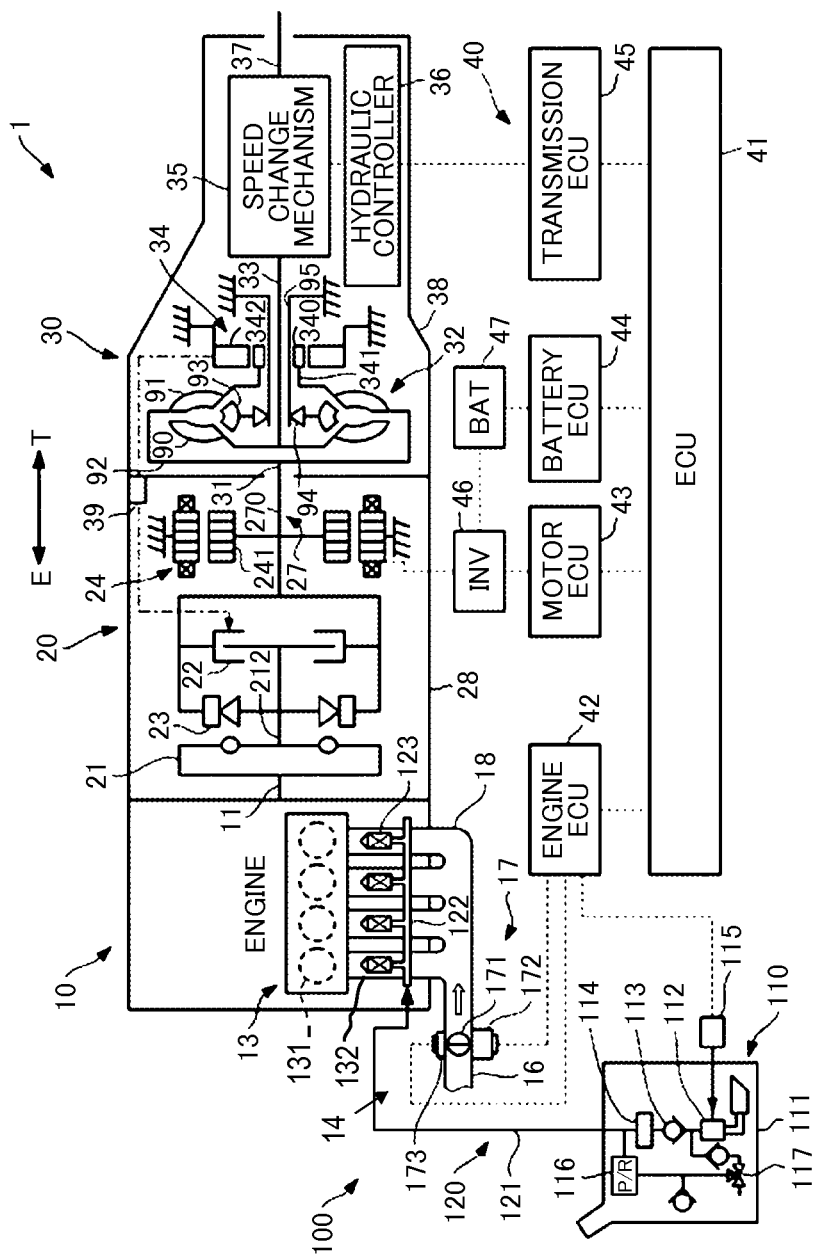
FIG. 1 is a schematic skeleton diagram that shows a vehicle control apparatus according to an embodiment of the present invention.
Figure 3:
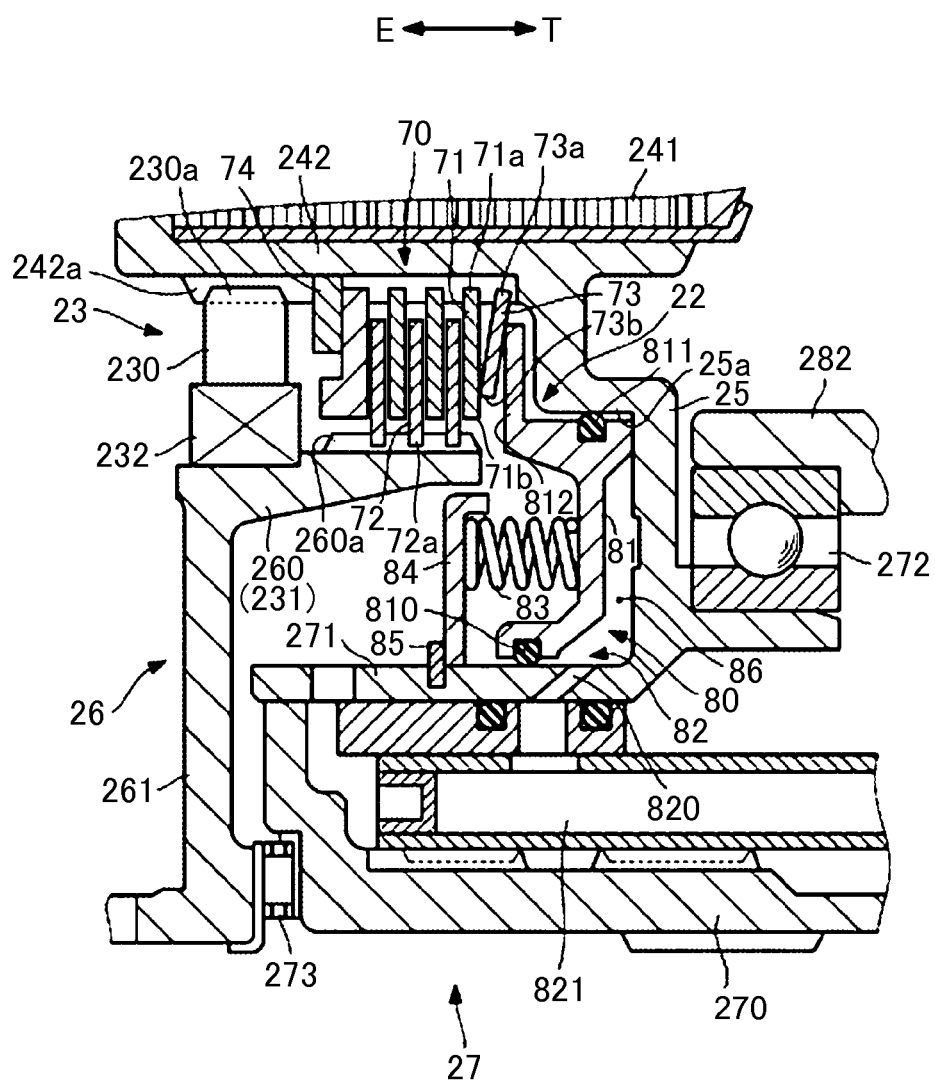
FIG. 3 is a schematic diagram that shows a main part of the driving unit of the vehicle control apparatus according to the embodiment of the present invention.

As shown in FIGS. 1-3, the driving system 1 includes an engine 10, a fuel supply system 100, a driving unit 20, an automatic transmission 30, and a control unit 40. In this embodiment, the direction to the engine 10 of the driving system 1 is designated as an engine side E, and the direction to the automatic transmission 30 of the driving system 1 is designated as an automatic transmission side T.

The engine 10 is formed with a well-known power unit that outputs the power by combusting a mixture of air and hydrocarbon-based fuel such as gasoline or diesel fuel in a combustion chamber which is unillustrated in the drawing. The engine 10 includes an engine body 13, an intake system 14, and an unillustrated exhaust system. The engine 10 forms an internal combustion engine in the present invention.

The engine body 13 includes a plurality of cylinders 131 and intake ports 132 that is provided for the respective cylinders 131. The intake ports 132 communicate with the insides and the outsides of the cylinders 131.

The intake system 14 includes an intake pipe 16, a throttle valve section 17, and an intake manifold 18. The intake manifold 18 connects the intake pipe 16 to the intake ports 132.

The throttle valve section 17 includes a throttle valve 171 and a throttle motor 172. The throttle valve 171 is disposed in a downstream section of the intake pipe 16 and adjusts an intake flow rate of intake air supplied to each of the cylinders 131. The throttle motor 172 is of an electronic control type and capable of opening and closing the throttle valve 171 by control of the control unit 40. A throttle opening sensor 173 is provided to the throttle valve 171. The throttle opening Sensor 173 detects the opening of the throttle valve 171 and inputs it to the control unit 40.

The engine 10 repeats intake, combustion, and exhaust of the air-fuel mixture in the combustion chamber of each cylinder 131 to reciprocate an unillustrated piston in each cylinder 131 and thus rotates a crankshaft 11 that is connected to the piston so as to be able to achieve power transmission. The engine 10 transmits torque from the crankshaft 11 to the driving unit 20. An engine speed sensor 19 is provided to the crankshaft 11. The engine speed sensor 19 detects the rotational speed of the crankshaft 11 and inputs it to the control unit 40. The engine speed sensor 19 forms internal combustion engine speed detection means.

The fuel supply system 100 includes a fuel tank unit 110 and a piping unit 120. The fuel supply system 100 functions as fuel supply means.

The fuel tank unit 110 includes a fuel tank 111, a fuel pump 112, a discharge check valve 113, a fuel filter 114, a fuel pump control computer 115, a pressure regulator 116, and a solenoid valve 117. The fuel is stored in the fuel tank 111.

The fuel pump 112 pumps up the fuel in the fuel tank 111 to discharge and feeds it to the piping unit 11 via the discharge check valve 113 and the fuel filter 114. This fuel pump 112 is a low-pressure, discharge-pressure variable pump and includes a pump rotor and a motor which are unillustrated in the drawing. The rotational speed of the pump rotor is changed in response to the rotational speed of a motor drive, so that the discharge flow rate and feed pressure of the fuel pump 112 is changed.

The fuel pump control computer 115 is interposed between the control unit 40 and the fuel pump 112. The fuel pump control computer 115 turns on and off the fuel pump 112 or controls the rotational speed based on a pump control signal from the control unit 40.

The pressure regulator 116 is connected to the piping unit 120 on the downstream side of the fuel filter 114. The solenoid valve 117 is formed with a three-way valve and connected to a discharge-side pipe of the fuel pump 112, an excess fuel discharge pipe of the variable pressure regulator 116, and a pipe opened to the fuel in the fuel tank 111.

The fuel pump 112 is formed herein as a pump of which the feed pressure is variable; however, the fuel pump 112 is not limited to this, and the fuel pump 112 may be formed as a pump of which the feed pressure is constant. In this case, the back pressure of the variable pressure regulator 116 may be changed between at least two stages that are high pressure and low pressure by the solenoid valve, and thus the feed pressure may be controlled.

The piping unit 11 includes a fuel pipe 121, a delivery pipe 122, and a fuel injection valve 123 that are connected in this order.

The fuel pipe 121 is connected to the fuel filter 114 of the fuel tank unit 110. The fuel pipe 121 is connected to the delivery pipe 122. The delivery pipe 122 is connected to the fuel injection valve 123. The fuel injection valve 123 is disposed so as to be capable of spraying the fuel into the intake port 132. The fuel injection valve 123 is formed with the solenoid valve and sprays the fuel into the intake port 132 according to the control signals produced by the control unit 40.

The driving unit 20 includes an input part 21, a clutch 22, a one-way clutch 23, a motor generator 24, a drum 25, a hub part 26, an output part 27, and a case part 28. The motor generator 24 forms an electric motor in the present invention. The driving unit 20 is interposed between the engine 10 and the automatic transmission 30 and transmits the power from the crankshaft 11 of the engine 10 to a transmission input shaft 31 described below of the automatic transmission 30.

The input part 21 includes a flywheel 210, a damper 211, a clutch input shaft 212, a sleeve 213, and a bearing 214. The flywheel 210 is connected to the crankshaft 11 so as to rotate together as one unit.

The damper 211 is connected to the flywheel 210 at the periphery so as to rotate together as one unit. The damper 211 is connected to the clutch input shaft 212 at the center so as to rotate together as one unit. The damper 211 absorbs the force in rotational direction between the flywheel 210 and the clutch input shaft 212.

The clutch input shaft 212 is disposed coaxially with the crankshaft 11. The clutch input shaft 212 is connected to the clutch 22 and the one-way clutch 23 so as to be capable of rotating together as one unit and transmits the power to the clutch 22 and the one-way clutch 23.

The sleeve 213 is mounted to an outer peripheral side section of the clutch input shaft 212 so as to rotate together as one unit. The bearing 214 is formed with a ball bearing and fixed to the outer peripheral side section of the sleeve 213.

The output part 27 includes a clutch output shaft 270, a sleeve 271, a bearing 272, and a thrust bearing 273.

The clutch output shaft 270 is disposed coaxially with the clutch input shaft 212. The clutch output shaft 270 is connected to the clutch 22 and the one-way clutch 23 so as to be capable of rotating, together as one unit and transmits the power of the clutch 22 and the one-way clutch 23 to the outside. The clutch output shaft 270 is connected to the transmission input shaft 31 of the automatic transmission 30 so as to be capable of rotating together as one unit and transmits the output of the driving unit 20 to the automatic transmission 30.

The sleeve 271 is mounted to an outer peripheral section of the clutch output shaft 270 so as to rotate together as one unit. The bearing 272 is formed with the ball bearing and disposed on the automatic transmission side T of the sleeve 271 so as to be capable of rotating together with the clutch output shaft 270 as one unit. The thrust bearing 273 is disposed between end faces of the clutch input shaft 212 and the clutch output shaft 270 that face each other and supports the clutch input shaft 212 and the clutch output shaft 270 in the axial direction so as to be capable of rotating relatively to each other.

The motor generator 24 includes a stator 240, a rotor 241, and a rotor case 242. The motor generator 24 is interposed in a power transmission path between the crankshaft 11 and the transmission input shaft 31.

The stator 240 includes a stator core 240a and a three-phase coil 240b wound around the stator core 240a. The stator core 240a is formed by stacking thin magnetic steel sheets, for example, and fixed to the case part 28. The stator 240 forms a rotating magnetic field by energization of the three-phase coil 240b.

The rotor 241 is arranged inside the stator 240 and formed with a plurality of permanent magnets embedded therein. The rotor case 242 houses the rotor 241. The rotor case 242 has an approximately cylindrical shape and disposed at a position on the outer peripheral side of the sleeve 271 of the output part 27. The rotor case 242 includes a spline 242a along the axial direction in an inner peripheral side section.

A motor rotational speed sensor 243 is provided to the rotor case 242. The motor rotational speed sensor 243 detects the rotational speed of the rotor 241 and thus detects the rotational speed of the motor generator 24 to input it to the control unit 40.

The motor generator 24 operates as the electric motor that rotates and drives the rotor 241 by the interaction between the magnetic field by the permanent magnets embedded in the rotor 241 and the magnetic field formed by the three-phase coil 240b. The motor generator 24 also operates as an electric generator that generates electromotive force across the ends of the three-phase coil 240b by the interaction between the magnetic field by the permanent magnets embedded in the rotor 241 and the rotation of the rotor 241.

The motor generator 24 is connected to an inverter 46. The inverter 46 is connected to a battery 47. Consequently, the motor generator 24 exchanges electric power with the battery 47 through the inverter 46. The battery 47 charges or discharges the electric power generated by the motor generator 24 in accordance with the driving condition of the hybrid vehicle.

An MG current sensor 461 is installed in an electric power line from the inverter 46 to the motor generator 24. The MG current sensor 461 detects a phase current and inputs it to the control unit 40. A battery voltage sensor 471 is installed between output terminals of the battery 47. The battery voltage sensor 471 detects the output voltage of the battery 47 and inputs it to the control unit 40. A battery current sensor 472 is installed in the output terminal of the battery 47. The battery current sensor 472 detects charging or discharging current of the battery 47 and inputs it to the control unit 40. A battery temperature sensor 473 is installed in the battery 47. The battery temperature sensor 473 detects battery temperature and inputs it to the control unit 40.

The drum 25 connects the rotor case 242 to the sleeve 271 and integrates the rotor case 242 with the sleeve 271. A stepped section 25a of which the outer peripheral side is displaced to the engine side E is formed in the center of the drum 25 in the radial direction. The rotation of the rotor 241 is transmitted to the clutch output shaft 270 via the drum 25 and the sleeve 271.

The hub part 26 includes a hub body 260 and a support plate 261.

The hub body 260 has a cylindrical shape and includes a spline 260a along the axial direction in an outer peripheral side section of the hub body 260. The hub body 260 is inserted between the rotor case 242 and the sleeve 271. The support plate 261 connects an end of the hub body 260 on the engine side E to an end of the clutch input shaft 212 on the automatic transmission side T and integrates the hub body 260 with the clutch input shaft 212.

The hub body 260 is connected to the crankshaft 11 so as to rotate together as one unit through the support plate 261, the clutch input shaft 212, the damper 211, and the flywheel 210. Conversely, the rotation of the crankshaft 11 is transmitted to the hub body 260 through a route of the flywheel 210→the damper 211→the clutch input shaft 212→the support plate 261.

The clutch 22 includes a multiple-disk part 70 and a piston part 80. The clutch 22 is disposed between the input part 21 and the output part 27. The clutch 22 is disposed between the crankshaft 11 and the transmission input shaft 31 and engages and disengages between the crankshaft 11 and the transmission input shaft 31. That is, the transmission state of the clutch 22 is changed between a disengagement state in which the engine 10 is disengaged from the motor generator 24 and an engagement state in which the engine 10 is engaged with the motor generator 24.

The clutch 22 is of a normally-opened type. The clutch 22 is normally disengaged so that the connection between the engine 10 and the motor generator 24 is disengaged and operated by the supply of high-pressure hydraulic fluid from an oil pump 34 to engage the engine 10 with the motor generator 24. The clutch 22 is disposed in an inner peripheral section of the motor generator 24.

The multiple-disk part 70 is disposed between the rotor case 242 and the hub body 260. The multiple-disk part 70 includes a plurality of separator plates 71, a plurality of friction plates 72, a cushion plate 73, and a snap ring 74.

A separator plate 71 has a ring shape and includes a spline external tooth 71a formed in the outer peripheral section and a through hole 71b formed in the inner peripheral section. The spline external tooth 71a is provided so as to be capable of sliding in the axial direction by meshing with the spline 242a of the rotor case 242. Consequently, the separator plate 71 rotates together with the rotor case 242 as one unit. The hub body 260 is inserted in the through hole 71b without contact.

A friction plate 72 has a ring shape and includes a spline internal tooth 72a formed in the inner peripheral section. The spline internal tooth 72a is provided so as to be capable of sliding in the axial direction by meshing with the spline 260a of the hub body 260. Consequently, the friction plate 72 rotates together with the hub body 260 as one unit.

The separator plate 71 and the friction plate 72 are alternately and adjacently disposed to each other. The separator plate 71 and the friction plate 72 are pressed against each other in the axial direction and produce friction between them in rotational direction, and thus the rotor case 242 is engaged with the hub part 26. When the pressing of the separator plate 71 and the friction plate 72 in the axial direction is released and the friction between them is not produced, the rotor case 242 is disengaged from the hub part 26.

The cushion plate 73 has a ring shape and includes a spline external tooth 73a formed in the outer peripheral section and a through hole 73b formed in the inner peripheral section. The spline external tooth 73a is provided so as to be capable of sliding in the axial direction by meshing with the spline 242a of the rotor case 242. Consequently, the cushion plate 73 rotates together with the rotor case 242 as one unit. The cushion plate 73 is disposed so as to be positioned on the automatic transmission side T from all of the separator plates 71 and the friction plates 72.

The snap ring 74 has a ring shape and is fixed to the spline 242a of the rotor case 242 on the engine side E from all of the separator plates 71 and the friction plates 72. Consequently, the snap ring 74 has a stopper function so that the separator plates 71, the friction plates 72, and the cushion plate 73 do not fall off the spline 242a of the rotor case 242.

The piston part 80 is disposed between the drum 25 and the multiple-disk part 70. The piston part 80 includes a piston 81, a hydraulic pressure supply section 82, a return spring 83, a supporting plate 84, and a stopper ring 85.

The piston 81 is disposed between the sleeve 271 and the stepped section 25a so as to be capable of sliding in the axial direction. The piston 81 includes an inner O-ring 810, an outer O-ring 811, and a pressing part 812.

The inner O-ring 810 is disposed in the inner peripheral side section of the piston 81 and comes into contact with the outer peripheral side section of the sleeve 271. The outer O-ring 811 is disposed in the outer peripheral side section of the piston 81 and comes into contact with the inner peripheral side section of the stepped section 25a of the drum 25. The pressing part 812 faces the cushion plate 73 and presses the cushion plate 73 in association with sliding movement of the piston 81 to the engine side E.

The hydraulic pressure supply section 82 includes a hydraulic pressure supply hole 820 and a hydraulic pressure supply passage 821. The hydraulic pressure supply hole 820 is formed in the sleeve 271 and connects between a space 86 enclosed with the piston 81 and the drum 25 and a space on the inner peripheral side of the sleeve 271. The hydraulic pressure supply passage 821 connects between the hydraulic pressure supply hole 820 and the mechanical oil pump 34 of the automatic transmission 30 described below.

When the high-pressure hydraulic fluid is supplied to the space 86 enclosed with the piston 81 and the drum 25 via the hydraulic pressure supply passage 821 and the hydraulic pressure supply hole 820, the piston 81 slides to the engine side E. When the piston 81 moves to the engine side E, the pressing part 812 presses and engages the friction plate 72 and the separator plate 71 to the engine side E through the cushion plate 73. Because of the engagement between the friction plate 72 and the separator plate 71, the rotor 241 and the hub part 26 rotates together as one unit.

The return spring 83 is formed of a number of compression coil springs arranged along circumferential direction and disposed to press the piston 81 from the engine side E to the automatic transmission side T. The supporting plate 84 has a ring shape and supports the engine side E of the return spring 83. The movement of the supporting plate 84 to the engine side E is restricted by the stopper ring 85. The stopper ring 85 is fixed in the sleeve 271.

When the hydraulic pressure in the hydraulic pressure supply passage 821 decreases to be smaller than urging force of the return spring 83, the piston 81 slides to the automatic transmission side T by the action of the return spring 83. When the piston 81 slides to the automatic transmission side T, the friction plates 72 and the separator plates 71 are disengaged, and the rotor 241 and the hub part 26 individually rotate.

The one-way clutch 23 is disposed between the rotor case 242 and the hub body 260. The one-way clutch 23 is disposed between the crankshaft 11 and the transmission input shaft 31 and connected so as to be capable of transmitting only the power in a forward rotational direction from the crankshaft 11 to the motor generator 24 via the transmission input shaft 31. The forward rotational direction herein means the rotational direction of the crankshaft 11. The one-way clutch 23 is also disposed in the inner peripheral section of the motor generator 24. The one-way clutch 23 is arranged adjacently to the multiple-disk part 70 in the inner peripheral section of the motor generator 24 in the axial direction.

The one-way clutch 23 includes an outer ring part 230, an inner ring part 231, and a rotation restricting part 232:

The outer ring part 230 includes a spline 230a along the axial direction in the outer peripheral side section. The spline 230a of the outer ring part 230 meshes with the spline 242a of the rotor case 242. Thus, the outer ring part 230 of the one-way clutch 23 rotates together with the rotor case 242 as one unit. The outer ring part 230 is also connected to the clutch output shaft 270 via the rotor case 242 so as to rotate together as one unit.

The inner ring part 231 is also served as the hub body 260. Thus, the inner ring part 231 of the one-way clutch 23 rotates together with the hub part 26 as one unit. The inner ring part 231 is also connected to the crankshaft 11 via the hub part 26 and the input part 21 so as to rotate together as one unit.

The rotation restricting part 232 is disposed between the outer ring part 230 and the inner ring part 231. The rotation restricting part 232 restricts the rotation of the inner ring part 231 only in the forward rotational direction with respect to the outer ring part 230.

When the rotational speed of the crankshaft 11 is greater than the rotational speed of the clutch output shaft 270, the one-way clutch 23 transmits the rotation of the crankshaft 11 to the clutch output shaft 270. Additionally, when the rotational speed of the crankshaft 11 is less than the rotational speed of the clutch output shaft 270, the one-way clutch 23 does not transmit the rotation of the crankshaft 11 to the clutch output shaft 270, and the clutch output shaft 270 rotates freely.

The case part 28 includes a case body 280, an engine-side rib 281, and an automatic-transmission-side rib 282. The case body 280 houses the input part 21, the clutch 22, the one-way clutch 23, the motor generator 24, the drum 25, the hub part 26, and the output part 27.

The engine-side rib 281 has a ring shape that is centered on the clutch input shaft 212, is provided on the engine side E of the motor generator 24, and fixed to the case body 280. The sleeve 213 is rotatably mounted in the inner peripheral section of the engine-side rib 281 through the bearing 214 of the input part 21. Consequently, the sleeve 213, the clutch input shaft 212, and the hub part 26 are rotatably supported by the engine-side rib 281.

An input shaft rotation sensor 29 is mounted between the engine-side rib 281 and the sleeve 213. The input shaft rotation sensor 29 detects the rotational speeds of the clutch input shaft 212 and the hub part 26 and input them to the control unit 40. The input shaft rotation sensor 29 is a resolver and includes a sensor stator 29a and a sensor rotor 29b. The sensor stator 29a is mounted on the engine-side rib 281. The sensor rotor 29b is mounted on the sleeve 213. As the input shaft rotation sensor 29, various sensors other than the resolver may be used.

The automatic-transmission-side rib 282 has a ring shape that is centered on the clutch output shaft 270, is provided on the automatic transmission side T of the motor generator 24, and fixed to the case body 280. The sleeve 271 is rotatably mounted in the inner peripheral section of the automatic-transmission-side rib 282 through the bearing 272. Consequently, the sleeve 271 and the clutch output shaft 270 are rotatably supported by the automatic-transmission-side rib 282.

As shown in FIG. 1, the automatic transmission 30 includes the transmission input shaft 31, a torque converter 32, a speed change mechanism input shaft 33, the oil pump 34, a speed change mechanism 35, a hydraulic controller 36, an output shaft 37, and a case 38.

The torque converter 32 is of a hydraulic type that uses the action of circulating hydraulic fluid and transmits driving force that is transmitted from the clutch output shaft 270 of the driving unit 20 to the speed change mechanism 35 through the speed change mechanism input shaft 33. The torque converter 32 includes a turbine runner 90, a pump impeller 91, a front cover 92, a stator 93, a one-way clutch 94, and a hollow shaft 95.

The turbine runner 90 and the pump impeller 91 are arranged to face each other such that the turbine runner 90 is located on the engine side E. The turbine runner 90 is connected to the speed change mechanism input shaft 33 so as to rotate together as one unit. The pump impeller 91 is connected to the transmission input shaft 31 through the front cover 92 so as to rotate together as one unit.

The stator 93 is disposed on an inner peripheral side between the turbine runner 90 and the pump impeller 91. The hollow shaft 95 is connected to the stator 93 through the one-way clutch 94. The hollow shaft 95 is fixed to the case 38 and houses the speed change mechanism input shaft 33 in its inside in a rotatable manner. The hydraulic fluid is supplied inside the case 38.

The oil pump 34 includes a rotor 340, a hub 341, and a body 342. The hub 341 has a cylindrical shape and connects the rotor 340 to the pump impeller 91 so as to rotate together as one unit. The body 342 is fixed in the case 38. Consequently, the power from the driving unit 20 is transmitted from the front cover 92 to the rotor 340 through the pump impeller 91, and the oil pump 34 is driven.

The hydraulic fluid discharged from the oil pump 34 is supplied to the speed change mechanism 35 and also to the clutch 22 in the driving unit 20 (shown with an alternate long and short dash line in FIG. 1). The supply of the hydraulic pressure by the oil pump 34 allows the change of the speed stage or gear ratio of the speed change mechanism 35 or the engagement of the clutch 22.

A hydraulic pressure control valve 39 is disposed between the oil pump 34 and the clutch 22. The hydraulic pressure control valve 39 adjusts the supply amount of the hydraulic fluid from the oil pump 34 to the clutch 22 in accordance with the signal from the control unit 40.

The speed change mechanism 35 has a plurality of clutches and brakes which are unillustrated. In the speed change mechanism 35, the engagement and the disengagement of the plurality of clutches and brakes are changed by using the hydraulic pressure supplied from the hydraulic controller 36 in accordance with a driving condition of the hybrid vehicle, and thus the desired speed stage is achieved. The speed stage of the speed change mechanism 35 includes, for example, an N (neutral) position, a D (drive) position, an R (reverse) position, an M (manual) position (sequential position), a 2 (second) position, an L (low) position, a B (brake) position, an S (sports) position, and the like.

A shift lever 51 is connected to the speed change mechanism 35 for changing the speed stage by a driver. A shift position sensor 52 is provided to the shift lever 51. The shift position sensor 52 detects the position of the shift lever 51 as a shift position signal and inputs it to the control unit 40. The shift position sensor 52 constitutes position detection means.

A plurality of driving modes can be changed in the speed change mechanism 35. The driving mode is a speed change program that is separately set from the position of the speed change mechanism 35 and set by the control unit 40.

The driving mode includes a normal mode as well as a sports mode, a manual mode, and an eco-mode, for example. The sports mode is set such that high engine speed is always maintained and cornering control is performed for controlling unnecessary gear change during the cornering, for example. Consequently, the sports mode and the manual mode are set so that power performance such as responsivity of an accelerator pedal 53 is regarded as important. In the eco-mode, the improvement of fuel economy gains a high priority, and the power performance is not regarded as important.

The shift lever 51 is provided with a driving mode selector switch for changing the driving mode by the driver which is unillustrated in the drawing. The shift position sensor 52 detects the driving mode selected with the driving mode selector switch as a driving mode signal and inputs it to the control unit 40. In this case, the shift position sensor 52 constitutes driving mode detection means.

The driving force transmitted from the speed change mechanism input shaft 33 is transmitted to the output shaft 37 via the speed change mechanism 35 and also transmitted from the output shaft 37 to wheels via a differential which is unillustrated in the drawing. That is, the motor generator 24 is connected to the wheels. The speed change mechanism 35 of this embodiment is formed with a stepped type speed change mechanism; however, the speed change mechanism is not limited to the stepped type and may be formed with a stepless type speed change mechanism, for example.

Figure 4:
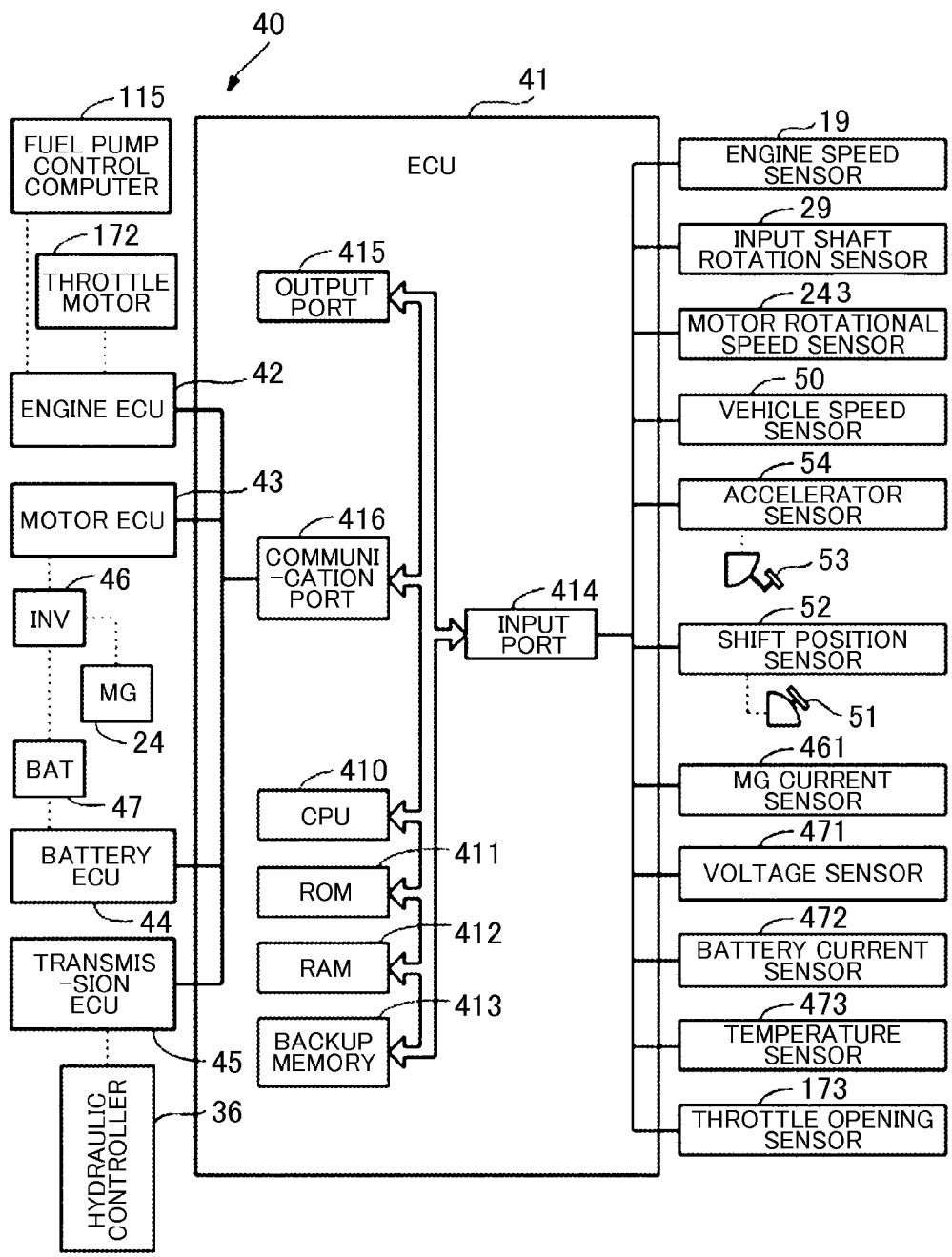
FIG. 4 is a schematic diagram that shows control means of the vehicle control apparatus according to the embodiment of the present invention.

As shown in FIG. 4, the control unit 40 includes an electronic control unit for a hybrid (hereinafter, referred to as ECU) 41, an electronic control unit for an engine (hereinafter, referred to as engine ECU) 42, an electronic control unit for a motor (hereinafter, referred to as motor ECU) 43, an electronic control unit for a battery (hereinafter, referred to as battery ECU) 44, and an electronic control unit for a transmission (hereinafter, referred to as transmission ECU) 45. The control unit 40 constitutes control means.

The ECU 41 includes a CPU (central processing unit) 410, a ROM (read only memory) 411 that stores a processing program and the like, a RAM (random access memory) 412 that temporally stores data, a backup memory 413, an input port 414, an output port 415, and a communication port 416. The ECU 41 exercises the control of the hybrid vehicle.

The input port 414 of the ECU 41 is connected to the engine speed sensor 19, an input shaft rotation sensor 29, the motor rotational speed sensor 243, a vehicle speed sensor 50, an accelerator sensor 54, the shift position sensor 52, the MG current sensor 461, the battery voltage sensor 471 and the battery current sensor 472, the battery temperature sensor 473, and the throttle opening sensor 173. The engine speed sensor 19, the vehicle speed sensor 50, the accelerator sensor 54, and the shift position sensor 52 constitute vehicle state detection means. The data detected by the engine speed sensor 19, the vehicle speed sensor 50, the accelerator sensor 54, and the shift position sensor 52 represent the states of the vehicle.

The vehicle speed sensor 50 detects a vehicle speed signal and inputs it to the control unit 40. The accelerator sensor 54 detects a depressing amount in which the accelerator pedal 53 is depressed and inputs the detection signal according to the depressing amount that is detected to the ECU 41. The ECU 41 calculates an accelerator opening Ace from the depressing amount of the accelerator pedal 53 represented by the detection signal output from the accelerator sensor 54.

The ECU 41 is connected to the engine ECU 42, the motor ECU 43, the battery ECU 44, and the transmission ECU 45 via the communication port 416. The ECU 41 exchanges various control signals and the data with the engine ECU 42, the motor ECU 43, the battery ECU 44, and the transmission ECU 45.

The engine ECU 42 is connected to the engine 10 and the ECU 41. The engine ECU 42 inputs signals from various sensors that detect the operating state of the engine 10 and executes operation control such as fuel injection control, ignition control, and intake air volume adjustment control in response to the input signal. The engine ECU 42 can execute the fuel control by controlling the fuel injection valve 123, the control of fuel pressure adjustment or fuel cut by controlling the fuel pump control computer 115, and the control of intake air volume by controlling the throttle motor 172.

The engine ECU 42 communicates with the ECU 41. The engine ECU 42 controls the operation of the engine 10 by using the control signal input from the ECU 41 and outputs, as needed, the data regarding the operating state of the engine 10 to the ECU 41.

The motor ECU 43 is connected to the inverter 46 and the ECU 41. The motor ECU 43 controls the driving of the motor generator 24. The motor ECU 43 inputs signals necessary for driving control of the motor generator 24. The signals necessary for the driving control of the motor generator 24 include, for example, a signal input from the motor rotational speed sensor 243 of the motor generator 24, a signal of the phase current detected by the MG current sensor 461 and applied to the motor generator 24, and the like. The motor ECU 43 outputs a switching control signal for the inverter 46.

The motor ECU 43 communicates with the ECU 41. The motor ECU 43 controls the driving of the inverter 46 in response to the control signal input from the ECU 41 and thus controls the driving of the motor generator 24. The motor ECU 43 outputs the data regarding the operating state of the motor generator 24 to the ECU 41 as needed.

The battery ECU 44 is connected to the battery 47 and the ECU 41. The battery ECU 44 manages the battery 47. The battery ECU 44 inputs signals necessary for managing the battery 47. The signals necessary for managing the battery 47 include, for example, a signal of voltage across terminals from the battery voltage sensor 471, a signal of the charging or discharging current from the battery current sensor 472, a signal of battery temperature from the battery temperature sensor 473, and the like.

The battery ECU 44 communicates with the ECU 41. The battery ECU 44 outputs the data regarding the state of the battery 47 to the ECU 41 as needed. The battery ECU 44 calculates remaining capacity (SOC: state of charge) in order to manage the battery 47 based on an integrated value of the charging or discharging current detected by the battery current sensor 472.

The transmission ECU 45 is connected to the automatic transmission 30 and the ECU 41. The transmission ECU 45 controls the driving of an unillustrated lock-up clutch of the torque converter 32 and changes the speed stage of the speed change mechanism 35.

The transmission ECU 45 communicates with the ECU 41. The transmission ECU 45 executes speed change control that changes the speed stage of the speed change mechanism 35 based on the signal from the ECU 41. The transmission ECU 45 outputs the data regarding, the operating state of the speed change mechanism 35 or the torque converter 32 to the ECU 41 as needed.

The engine 10, the motor generator 24, the clutch 22, the one-way clutch 23, and the control unit 40 that are described above constitute the vehicle control apparatus of the present invention. The vehicle control apparatus of the present invention changes a first transmission method and a second transmission method in accordance with a vehicle state when the power of the engine 10 is transmitted to the motor generator 24. The first transmission method is for transmitting the power through the one-way clutch 23 with the clutch 22 left disengaged and focuses on regeneration efficiency. The second transmission method is for transmitting the power through the clutch 22 with the clutch 22 engaged and focuses on drivability.

The control unit 40 changes the first transmission method and the second transmission method in accordance with the vehicle state detected by the vehicle state detection means when the power of the engine 10 is transmitted to the motor generator 24. The vehicle state detection means here is at least one of the engine speed sensor 19, the vehicle speed sensor 50, the accelerator sensor 54, and the shift position sensor 52.

When the vehicle state is the rotational speed of the engine 10, the vehicle state detection means is the engine speed sensor 19. In this case, the control unit 40 changes the transmission method of the power of the engine 10 to the motor generator 24 from the first transmission method to the second transmission method when the rotational speed of the engine 10 detected by the engine speed sensor 19 becomes greater than a specified value that is determined in advance. Consequently, the power of the engine 10 is transmitted to the wheels through the motor generator 24.

When the vehicle state is the vehicle speed, the vehicle state detection means is the vehicle speed sensor 50. In this case, the control unit 40 changes the transmission method of the power of the engine 10 to the motor generator 24 from the first transmission method to the second transmission method when the vehicle speed detected by the vehicle speed sensor 50 becomes greater than the specified value that is determined in advance. Consequently, the power of the engine 10 is transmitted to the wheels through the motor generator 24.

When the vehicle state is in the driving that focuses on the power performance or not, the vehicle state detection means is power performance state detection means that detects the state of the power performance. In this case, the control unit 40 changes the transmission method of the power of the engine 10 to the motor generator 24 from the first transmission method to the second transmission method when the state detected by the power performance state detection means is in the driving that focuses on the power performance. Consequently, the power of the engine 10 is transmitted to the wheels through the motor generator 24.

When the determination whether or not the vehicle is in the driving that focuses on the power performance is made in association with the position of the automatic transmission 30, the power performance state detection means is the shift position sensor 52. In this case, the control unit 40 changes the transmission method of the power of the engine 10 to the motor generator 24 from the first transmission method to the second transmission method when the driving position detected by the shift position sensor 52 is any one of the S-position, the M-position, the 2-position, the L-position, or the B-position.

When the determination whether or not the vehicle is in the driving that focuses on the power performance is made in association with the driving mode of the automatic transmission 31, the power performance state detection means is the shift position sensor 52. In this case, the control unit 40 changes the transmission method of the power of the engine 10 to the motor generator 24 from the first transmission method to the second transmission method when the driving mode detected by the shift position sensor 52 is either of the sports mode or the manual mode.

When the determination whether or not the vehicle is in the driving that focuses on the power performance is made in association with operating speed of the accelerator pedal 53 in the automatic transmission 31, the power performance state detection means is the accelerator sensor 54. In this case, the control unit 40 changes the transmission method of the power of the engine 10 to the motor generator 24 from the first transmission method to the second transmission method when depressing speed of the accelerator pedal 53 detected by the accelerator sensor 54 is faster than the specified value that is determined in advance.

The vehicle control apparatus of the present invention executes the fuel cut of the engine 10 if a stop command of the engine 10 is issued when the vehicle is driven with the first transmission method. Furthermore, the vehicle control apparatus of the present invention change the state of the clutch 22 to disengagement and executes the fuel cut of the engine 10 if the stop command of the engine 10 is issued when the vehicle is driven with the second transmission method.

In this case, the vehicle control apparatus includes the fuel supply system 100, internal combustion engine stop command detection means, and transmission method detection means.

The internal combustion engine stop command detection means detect the issue of the stop command of the engine 10 and is formed by the control unit 40. The internal combustion engine stop command detection means detect the issue of the stop command of the engine 10 when the accelerator sensor 54 detects the release of the accelerator pedal 53, for example.

The transmission method detection means detect which the transmission method of the vehicle is in the first transmission method or the second transmission method and is formed by the control unit 40.

As a result, the control unit 40 controls the fuel supply system 100 to execute the fuel cut so as to stop the supply of fuel to the engine 10 if the stop command to the engine 10 is detected when the vehicle is driven with the first transmission method. The control unit 40 changes the state of the clutch 22 to disengagement and controls the fuel supply system 100 to execute the fuel cut so as to stop the supply of fuel to the engine 10 if the stop command to the engine 10 is detected when the vehicle is driven with the second transmission method.

Next, functions are described.

Figure 5:
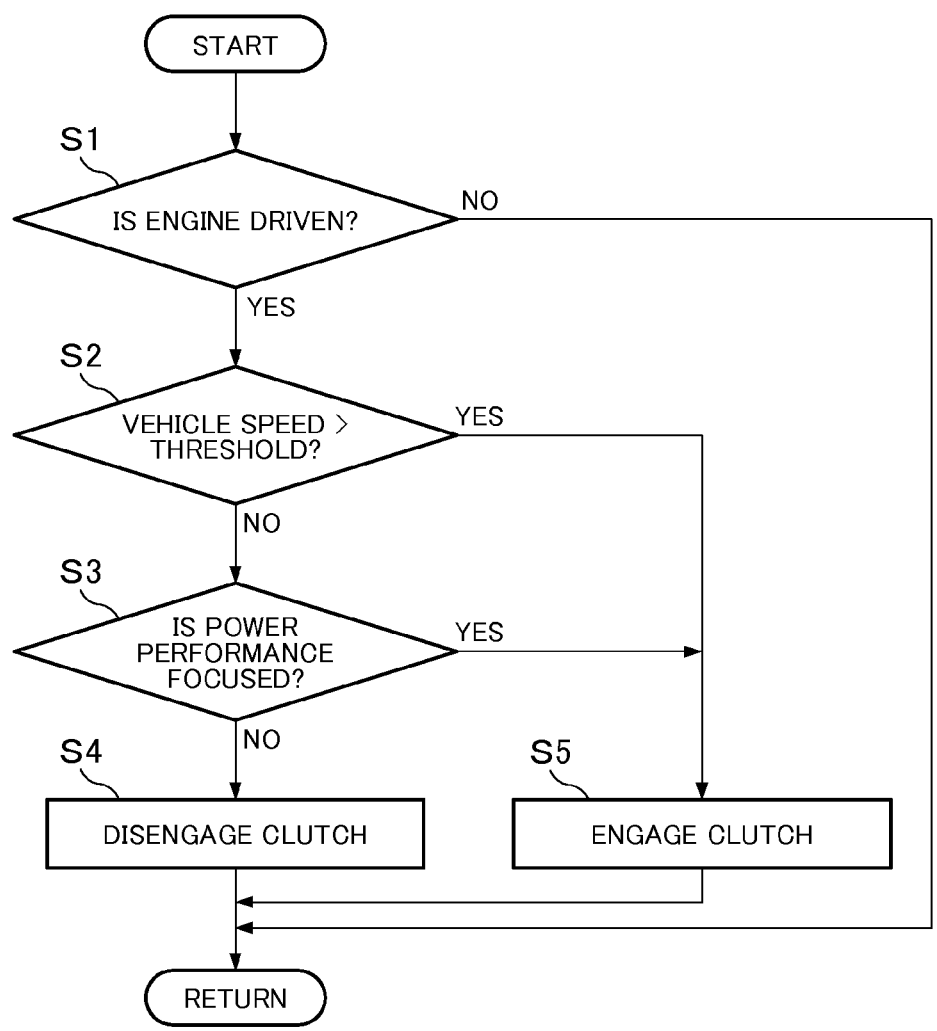
FIG. 5 is a flowchart that shows an operation in which the vehicle control apparatus according to the embodiment of the present invention selects either of a first transmission method and a second transmission method.

As shown in FIG. 5, the ECU 41 determines whether or not the engine 10 is driven (step S1). When the ECU 41 determines that the engine 10 is not driven (step S1; NO), the ECU 41 returns processing to the main routine.

When the ECU 41 determines that the engine 10 is driven (step S1; YES), the ECU 41 determines whether or not the vehicle speed exceeds a specified threshold (step S2). The determination whether or not the vehicle speed exceeds the threshold is made by the ECU 41 based on information from the vehicle speed sensor 50. The specified threshold is set to be 100 km/h, for example.

When the ECU 41 determines that the vehicle speed does not exceed the specified threshold (step S2; NO), the rotational speed of the crankshaft 11 is recognized to be not high, and the ECU 41 determines that the disengagement state of the clutch 22 is acceptable.

The ECU 41 determines whether or not the driving state of the vehicle is in the driving that focuses on the power performance (step S3). The ECU 41 here determines the driving state of the vehicle according to whether or not the driving position of the automatic transmission 30 is a specified position, whether or not the driving mode is a specified mode, or whether or not the operating speed of the accelerator pedal 53 exceeds a specified value that is determined in advance.

The specified position is one of the S-position, the M-position, the 2-position, the L-position, or the B-position, for example, and the M-position is set herein. The determination whether or not the speed stage of the automatic transmission 30 is in the M-position is made by the ECU 41 based on information from the shift position sensor 48.

The specified driving mode is either of the sports mode or the manual mode, for example. The determination whether or not the driving mode is either of the sports mode or the manual mode is made by the ECU 41 based on the information from the shift position sensor 48.

The determination whether or not the operating speed of the accelerator pedal 53 exceeds the specified value that is determined in advance is made by the ECU 41 based on information from the accelerator sensor 54 through the measurement of operating time and the calculation of the operating speed.

When the ECU 41 determines that the driving state of the vehicle is not in the driving that focuses on the power performance (step S3; NO), it is recognized that the driver does not require the responsivity of acceleration by depressing the accelerator pedal 53, and the ECU 41 determines that the disengagement state of the clutch 22 is acceptable.

Consequently, the ECU 41 selects the first transmission method and allows the clutch 22 to disengage (step S4). Therefore, the regeneration efficiency can be improved through the driving by using the one-way clutch 23.

On the other hand, in step S2, when the ECU 41 determines that the vehicle speed exceeds the threshold (step S2; YES), the rotational speed of the crankshaft 11 is recognized to be high. Thus, in order to suppress response delay during re-acceleration, the ECU 41 selects the second transmission method and allows the clutch 22 to engage (step S5). Therefore, the drivability can be improved through the driving by using the clutch 22.

Here, in the engagement state of the clutch 22, as the rotational speed of the crankshaft 11 is high, pushing force by the piston 81 of the clutch 22 may be increased, and thus engaging force of the clutch 22 may be increased. For example, the clutch 22 can be actuated in stages by separating the engagement of the clutch 22 into two stages of full engagement and half-engagement. That is, when the rotational speed of the crankshaft 11 is high in some degree, the half-engagement can be achieved, and when the rotational speed of the crankshaft 11 is high enough, the full engagement can be achieved.

In step S3, when the ECU 41 determines that the driving state of the vehicle is in the driving that focuses on the power performance (step S3; YES), it is recognized that the driver requires the responsivity of the accelerator pedal 53, and thus the ECU 41 selects the second transmission method and allows the clutch 22 to engage (step S5). Therefore, the drivability can be improved through the driving by using the clutch 22.

Next, the description will be made on the operation when the accelerator pedal 53 is released during the driving by the engine 10 with reference to a flowchart shown in FIG. 6.

Figure 6:
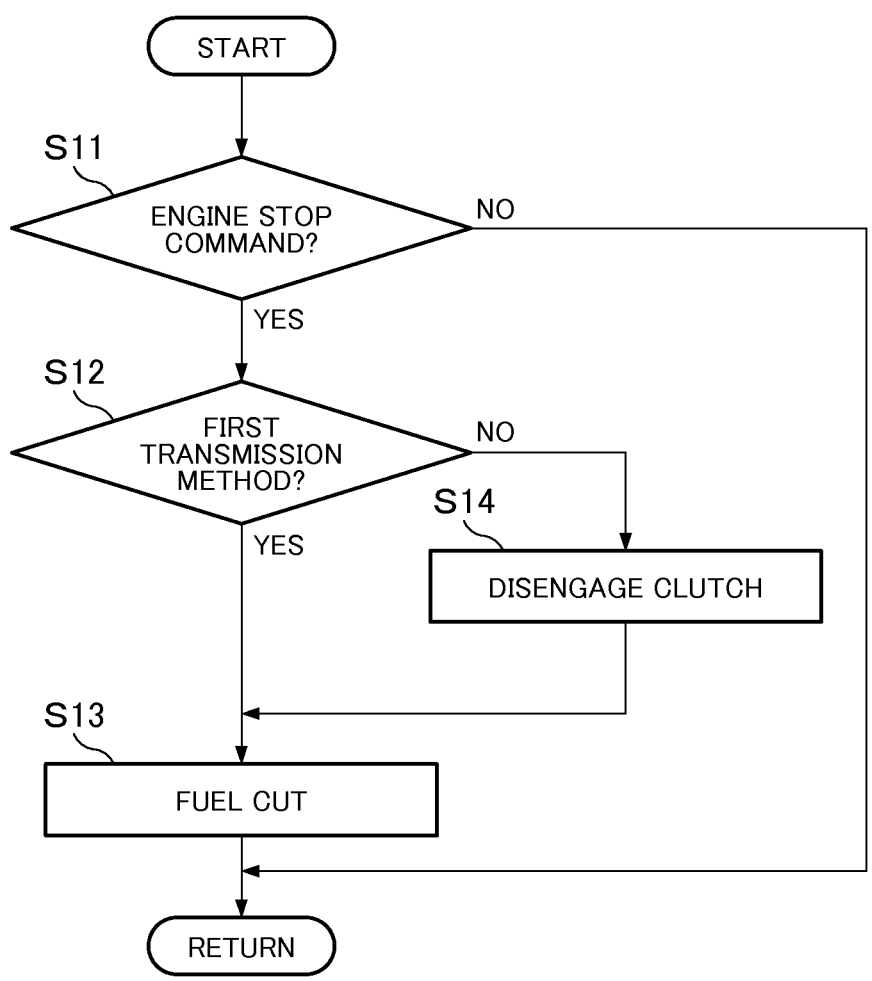
FIG. 6 is a flowchart that shows an operation in which the vehicle control apparatus according to the embodiment of the present invention executes fuel cut after an engine stop command.

As shown in FIG. 6, the ECU 41 determines whether or not the stop command of the engine 10 is issued (step S11). When the ECU 41 determines that the stop command of the engine 10 is not issued (step S11; NO), the ECU 41 returns the processing to the main routine.

When the ECU 41 determines that the stop command of the engine 10 is issued (step S11; YES), the ECU 41 determines whether or not the transmission method of the vehicle is the first transmission method (step S12).

When the ECU 41 determines that the transmission method of the vehicle is the first transmission method (step S12; YES), the ECU 41 starts the fuel cut (step S13). Specifically, the ECU 41 closes the fuel injection valve 123 through the engine ECU 42, and the ECU 41 stops the fuel pump 112 through the engine ECU 42 and the fuel pump control computer 115.

When the ECU 41 determines that the transmission method of the vehicle is not the first transmission method (step S12; NO), the ECU 41 allows the clutch 22 to engage (step S14). Then, the ECU 41 starts the fuel cut (step S13).

The description will be made on the operation when the accelerator pedal 53 is released during the driving by the engine 10 described above with reference to time charts shown in FIG. 7 and FIG. 8.

Figure 7:
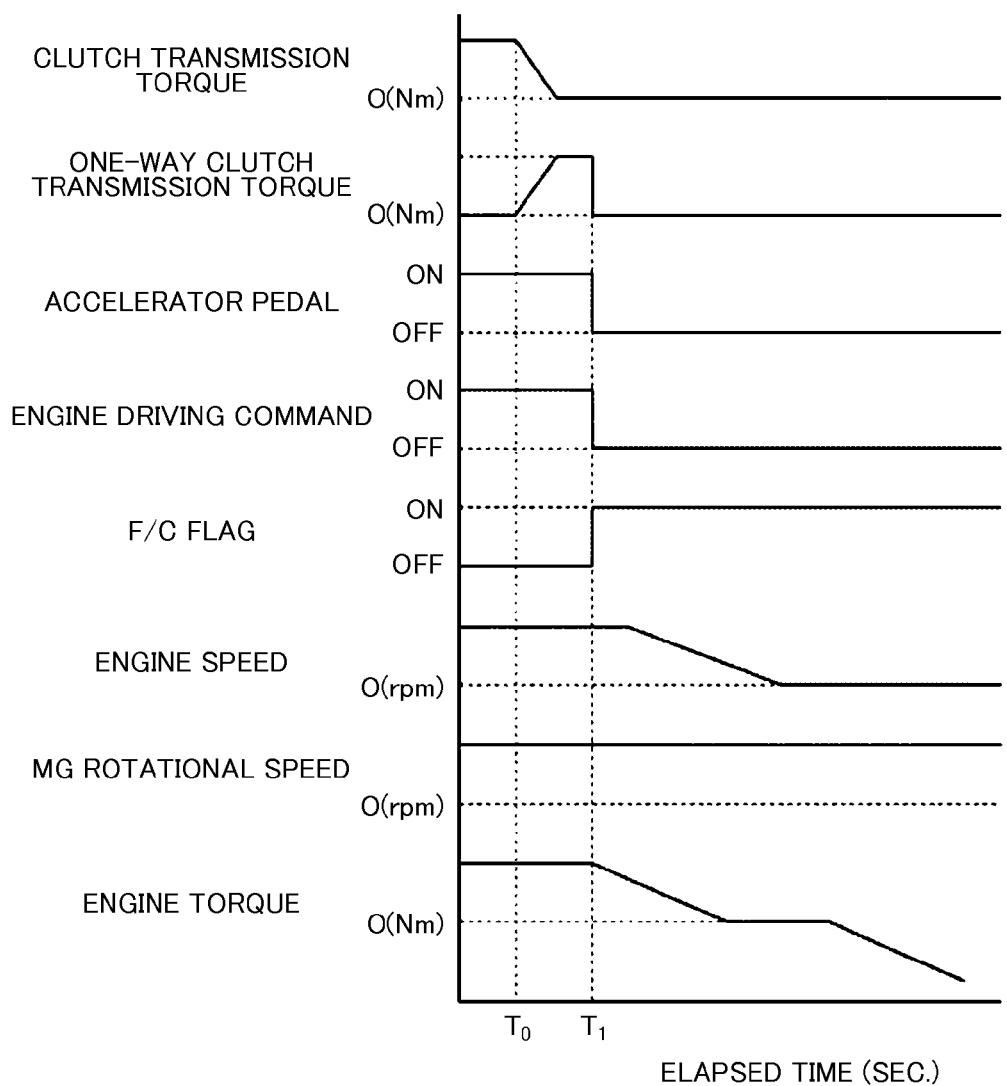
FIG. 7 is a time chart that shows an operation of the vehicle control apparatus according to Example 1.

As shown in FIG. 7, when the clutch 22 is in the engagement state and the vehicle is driven by the engine 10, at $T_0$, assume that the ECU 41 selects the first transmission method and the state of the clutch 22 is changed to the disengagement. In this case, the one-way clutch 23 transmits the power of the engine 10.

Then, at $T_1$, the driver releases the accelerator pedal 53. Consequently, an engine driving command becomes OFF, and thus the ECU 41 stops the engine 10. The ECU 41 also change a fuel cut flag to ON and executes the fuel cut.

The engine 10 stops by the execution of the fuel cut. Consequently, the engine speed gradually decreases, and the engine torque also decreases. Additionally, transmission torque by the one-way clutch 23 becomes zero.

Figure 8:
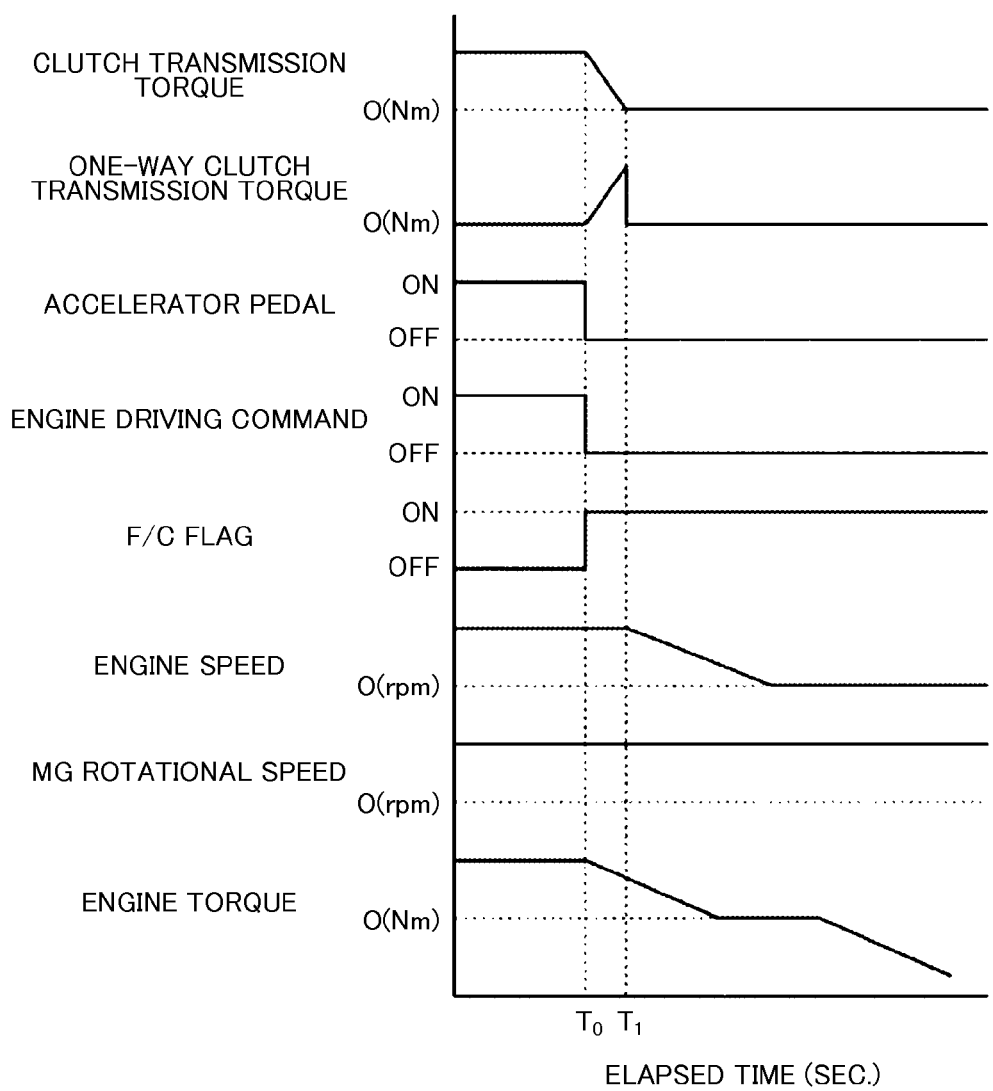
FIG. 8 is a time chart that shows an operation of the vehicle control apparatus according to Example 2.

As shown in FIG. 8, when the clutch 22 is in the engagement state and the vehicle is driven by the engine 10, at $T_0$, assume that the driver releases the accelerator pedal 53. Consequently, an engine driving command becomes OFF, and thus the ECU 41 stops the engine 10. The ECU 41 also change a fuel cut flag to ON and executes the fuel cut.

Additionally, the state of the clutch 22 is changed to the disengagement. Consequently, the one-way clutch 23 transmits the power of the engine 10; however, at $T_1$ for example, the rotational speed of the crankshaft 11 decreases to be less than that of the transmission input shaft 31, and thus the transmission by the one-way clutch 23 is disconnected.

When the hybrid vehicle comes to a stop in parking and the like and the engine 10 also stops, the oil pump 34 stops, and thus the hydraulic fluid is not supplied from the oil pump 34 to the piston part 80 of the clutch 22. Due to this, the piston 81 is separated from the multiple-disk part 70 by the urging force of the return spring 83, and the state of the clutch 22 is in the disengagement. At this time, a shift position of the speed change mechanism 35 is set to the neutral. The hydraulic pressure control valve 39 is kept opened.

To start the engine 10 when the hybrid vehicle comes to a stop in parking and the like and the engine 10 also stops, electric power is supplied to the motor generator 24. The rotor 241 of the motor generator 24 rotates by the supply of electric power to the motor generator 24. The driving force of the rotor 241 is transmitted to the oil pump 34 through a route of the rotor case 242→the drum 25→the sleeve 271→the clutch output shaft 270→the torque converter 32.

Here, even if the rotor case 242 rotates, the clutch 22 and the one-way clutch 23 are disengaged, and thus the power of the motor generator 24 is not transmitted to the engine 10. Although the speed change mechanism input shaft 33 of the speed change mechanism 35 rotates by the rotation of the torque converter 32, the shift position of the speed change mechanism 35 is in the neutral, and thus the output shaft 37 of the speed change mechanism 35 does not rotate.

The hydraulic fluid discharged from the oil pump 34 is supplied to the clutch 22. The piston 81 slides to the multiple-disk part 70 side, the multiple-disk part 70 is pressed in the axial direction, and the clutch 22 is engaged. Thus, the driving force of the rotor 241 is transmitted to the crankshaft 11 through a route of the rotor case 242→the multiple-disk part 70→the hub part 26→the input part 21. Consequently, the engine 10 starts.

At the start of the vehicle after the start of the engine 10, the driving force of the engine 10 is transmitted to the automatic transmission 30 through a route of the crankshaft 11→the input part 21→the hub part 26→the clutch 22→the rotor case 242→the drum 25→the sleeve 271→the clutch output shaft 270. The transmission of the power to the automatic transmission 30 causes the driving of the oil pump 34, and thus the hydraulic fluid is kept supplied to the clutch 22, and the engagement of the clutch 22 is maintained. The shift position of the speed change mechanism 35 is set to a forward or reverse movement. Therefore, the power of the crankshaft 11 is transmitted from the automatic transmission 30 to the wheels, and the hybrid vehicle starts to move.

When the hybrid vehicle comes to a stop in parking and the like and the engine 10 also stops, as described above, the hydraulic fluid is not introduced from the oil pump 34 to the piston part 80 of the clutch 22, and thus the clutch 22 is disengaged.

Here, when the vehicle starts to move by using only the driving force of the motor generator 24, electric power is supplied to the motor generator 24. The rotor 241 of the motor generator 24 rotates by the supply of electric power to the motor generator 24. The driving force of the rotor 241 is transmitted to the oil pump 34 through a route of the rotor case 242→the drum 25→the clutch output shaft 270→the torque converter 32.

Even if the rotor case 242 rotates, the clutch 22 and the one-way clutch 23 are disengaged, and thus the power of the motor generator 24 is not transmitted to the engine 10. The hydraulic pressure control valve 39 is kept closed. Consequently, the hydraulic fluid from the oil pump 34 is not supplied to the clutch 22.

The speed change mechanism input shaft 33 of the speed change mechanism 35 rotates as the torque converter 32 rotates. The shift position of the speed change mechanism 35 is set to the forward or reverse movement. Therefore, the power of the crankshaft 11 is transmitted from the automatic transmission 30 to the wheels, and the hybrid vehicle starts to move.

In case of starting the engine 10 when the vehicle is driven only by the driving force of the motor generator 24 while the engine 10 stops, the hydraulic pressure control valve 39 is opened, and the hydraulic fluid from the oil pump 34 is supplied to the clutch 22. The supply of the hydraulic fluid to the clutch 22 causes the engagement of the clutch 22. Consequently, the driving force of the motor generator 24 is transmitted to the hub part 26 and also transmitted from the hub part 26 to the crankshaft 11 through the input part 21. Thus, the engine 10 starts.

When a shortage of electric power of the battery 47 occurs during the driving of the engine 10 or a vehicle stop, the driving force of the engine 10 is used for the charge of the battery 47. The shift position of the automatic transmission 30 is in the neutral. The driving force of the engine 10 is transmitted from the hub part 26 to the rotor 241 through the one-way clutch 23. Consequently, the rotor 241 is rotated, and the motor generator 24 operates as a generator. Thus, the battery 47 is charged.

In case of charging by driving the motor generator 24 with the driving force of the wheels during vehicle travelling and decelerating, that is, in case of regenerative operation only by the motor generator 24 without the engine 10, the driving force of the wheels is transmitted to the oil pump 34 through the speed change mechanism 35. The hydraulic pressure control valve 39 is kept closed. Consequently, the hydraulic fluid occurred in the oil pump 34 is not supplied to the clutch 22, and therefore the clutch 22 is kept disengaged. The drum 25 connected to the speed change mechanism input shaft 33 rotates and the rotor 241 rotates, and therefore, the motor generator 24 operates as a generator, and the battery 47 is charged.

In case of charging by driving the motor generator 24 with the driving force of the wheels during vehicle travelling and decelerating, and at the same time, applying the engine brake, the driving force of the wheels is transmitted to the oil pump 34 through the automatic transmission 30. The hydraulic pressure control valve 39 is kept opened. Consequently, the hydraulic fluid occurred in the oil pump 34 is supplied to the clutch 22, and the clutch 22 is kept engaged.

The drum 25 connected to the speed change mechanism input shaft 33 rotates and the rotor 241 rotates, and therefore, the motor generator 24 operates as a generator, and the battery 47 is charged. The rotation of the drum 25 is transmitted to the crankshaft 11 through the clutch 22. Thus, the engine brake is applied.

As described above, according to the vehicle control apparatus relating to this embodiment, the ECU 41 changes, in accordance with the vehicle state, the first transmission method that focuses on the regeneration efficiency and uses the one-way clutch 23 and the second transmission method that focuses on the drivability and uses the clutch 22. Therefore, in accordance with the vehicle state, the driving that focuses on either the drivability or the regeneration efficiency can be changed. Consequently, both the drivability and the regeneration efficiency can be fulfilled.

According to the vehicle control apparatus relating to this embodiment, the ECU 41 allows the clutch 22 to engage when the vehicle speed exceeds the threshold. Therefore, in the state in which the rotational speed of the crankshaft 11 tends to increase, the ECU 41 allows the clutch 22 to engage and changes to the driving by the engine 10, and consequently, the drivability is improved.

According to the vehicle control apparatus relating to this embodiment, the ECU 41 allows the clutch 22 to engage when the shift position is the M-position. Therefore, since the responsivity of an accelerator pedal 53 is normally required for the M-position, the drivability can be improved.

According to the vehicle control apparatus relating to this embodiment, the ECU 41 allows the clutch 22 to engage when the driving mode is the sports mode or the manual mode. Therefore, since the responsivity of an accelerator pedal 53 is normally required for the mode that focuses on the power performance, the drivability can be improved.

According to the vehicle control apparatus relating to this embodiment, the ECU 41 allows the clutch 22 to engage when the operating speed of the accelerator pedal 53 is faster than the specified value that is determined in advance. Therefore, since the responsivity of an accelerator pedal 53 is normally required when the operating speed of the accelerator pedal 53 is greater than the specified value that is determined in advance, the drivability can be improved.

Figure 9:
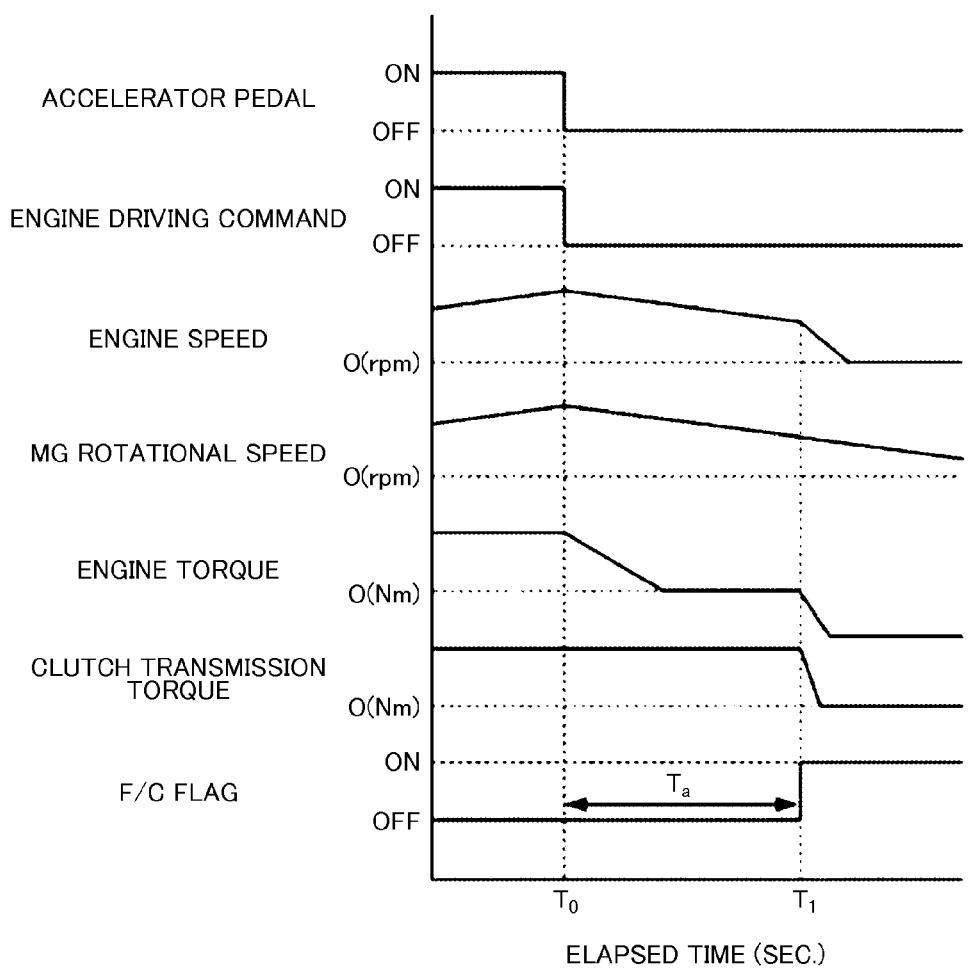
FIG. 9 is a time chart that shows an operation of the vehicle control apparatus according to Comparative Example.
Figure 10:
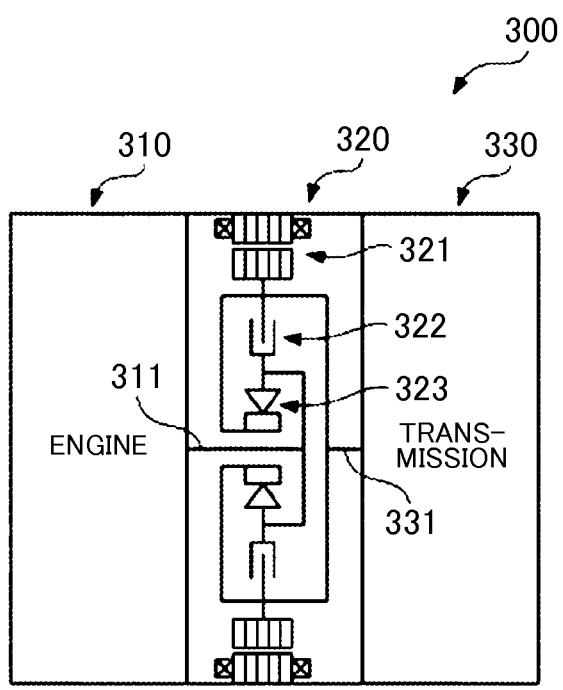
FIG. 10 is a schematic skeleton diagram that shows a conventional vehicle control apparatus.

According to the vehicle control apparatus relating to this embodiment, as shown in FIG. 6 to FIG. 8, the clutch 22 is disengaged and the fuel cut is executed when the stop command of the engine 10 is issued, and therefore the generation of vibration can be controlled when the engine torque changes from a positive value to a negative value. Additionally, as shown in FIG. 9, time to disengage the clutch can be shortened in comparison with the case where the transmission is conducted by only using the clutch in the engagement state without the one-way clutch 23, and thus the fuel cut can be accelerated. An acceleration in the fuel cut allows the improvement of fuel economy.

In the vehicle control apparatus of this embodiment described above, the clutch 22 is engaged when the shift position is the M-position. However, the vehicle control apparatus according to the present invention is not limited to this, and the shift position may be any one of the S-position, the 2-position, the L-position, or the B-position, for example.

In the vehicle control apparatus of this embodiment, the vehicle state is determined by the ECU 41 based on the vehicle speed and the driving that focuses on the power performance. However, the vehicle control apparatus according to the present invention is not limited to this, and the vehicle state may be determined based on the rotational speed of the crankshaft 11. In this case, when the rotational speed of the crankshaft 11 detected by the engine speed sensor 19 is greater than the specified value that is determined in advance, the second transmission method in which the clutch 22 is engaged is selected.

The driving system 1 of this embodiment has a structure in which the clutch 22 and the one-way clutch 23 are disposed in parallel in the inner peripheral section of the rotor 241. However, the driving system according to the present invention is not limited to this, and the driving system may have a structure in which the clutch 22 and the one-way clutch 23 are overlapped in the axial direction in the inner peripheral section of the rotor 241.

Example 1

The operation when the accelerator pedal 53 is released during the driving of the vehicle equipped with the engine 10 according to the embodiment described above is shown with a time chart in FIG. 7 as Example 1.

When the clutch 22 was in the engagement state and the vehicle was driven by the engine 10, at $T_0$, the ECU 41 selected the first transmission method and the state of the clutch 22 was changed to the disengagement. In this case, the one-way clutch 23 transmitted the power of the engine 10.

Then, at $T_1$, the driver released the accelerator pedal 53. Consequently, the engine driving command became OFF, and thus the ECU 41 stopped the engine 10. The ECU 41 also changed the fuel cut flag to ON and executed the fuel cut.

The engine 10 fully stopped by the execution of the fuel cut. Consequently, the engine speed gradually decreased, and the engine torque also decreased. Additionally, transmission torque by the one-way clutch 23 became zero.

Therefore, according to this Example, the fuel cut was achieved immediately after the release of the accelerator pedal 53.

Example 2

The operation when the accelerator pedal 53 is released during the driving of the vehicle equipped with the engine 10 according to the embodiment described above is shown with a time chart in FIG. 8 as Example 2.

When the clutch 22 is in the engagement state and the vehicle is driven by the engine 10, at $T_0$, the driver released the accelerator pedal 53. Consequently, the engine driving command became OFF, and thus the ECU 41 stopped the engine 10. The ECU 41 also changed the fuel cut flag to ON and executed the fuel cut.

Additionally, the state of the clutch 22 was changed to the disengagement. Consequently, the one-way clutch 23 transmitted the power of the engine 10; however, at $T_1$ for example, the rotational speed of the crankshaft 11 decreased to be less than that of the transmission input shaft 31, and thus the transmission by the one-way clutch 23 was disconnected.

Therefore, according to this Example, the fuel cut was also achieved immediately after the release of the accelerator pedal 53.

Comparative Example

The operation when the accelerator pedal is released during the driving of the vehicle equipped with a driving unit without the one-way clutch is shown with a time chart in FIG. 9 as Comparative Example. This driving unit has the same structure as that of the driving unit 20 of the embodiment described above other than the structure without the one-way clutch.

When the clutch was in the engagement state and the vehicle was driven by the engine, at $T_0$, the driver released the accelerator pedal. Consequently, the engine driving command became OFF, and thus the ECU stopped the engine.

In order to prevent the engine from racing and pulling in, the clutch was kept engaged. At $T_1$ when the engine torque dropped to zero (Nm) and the operation was stabilized, the clutch was disengaged, the fuel cut flag was changed to ON, and the fuel cut was executed.

Thus, with the structure of Comparative Example, a time lag of $T_0$ was required to execute the fuel cut after the release of the accelerator pedal.

According to Example 1 and Example 2, the time lag between the release of the accelerator pedal and the fuel cut can be shortened in comparison with Comparative Example, and therefore it has been verified that the fuel economy can be improved.

As described above, the vehicle control apparatus according to the present invention can provide the effects of fulfilling both the drivability and the regeneration efficiency and be useful for the control apparatus for the hybrid vehicles.

DESCRIPTION OF REFERENCE NUMERALS

1/DRIVING SYSTEM
10/ENGINE
11/CRANKSHAFT
19/ENGINE SPEED SENSOR
20/DRIVING UNIT
22/CLUTCH
23/ONE-WAY CLUTCH
24/MOTOR GENERATOR
30/AUTOMATIC TRANSMISSION
31/TRANSMISSION INPUT SHAFT
34/OIL PUMP
40/CONTROL UNIT
41/ECU
50/VEHICLE SPEED SENSOR
52/SHIFT POSITION SENSOR
53/ACCELERATOR PEDAL
54/ACCELERATOR SENSOR

The invention claimed is:

1. A control apparatus for a vehicle comprising:
an internal combustion engine;
an electric motor connected to a wheel;
a clutch configured to change between a disengagement state in which the internal combustion engine is disengaged from the electric motor and an engagement state in which the internal combustion engine is engaged with the electric motor; and
a one-way clutch configured to transmit only power in a forward rotational direction from the internal combustion engine to the electric motor,
an electronic control unit configured to:
i) change a first transmission method for transmitting the power through the one-way clutch with the clutch disengaged and a second transmission method for transmitting the power through the clutch with the clutch engaged in accordance with rotational speed of the internal combustion engine when the power of the internal combustion engine is transmitted to the electric motor; and
ii) change the first transmission method to the second transmission method and transmit the power of the internal combustion engine to the wheel through the electric motor when the rotational speed of the internal combustion engine becomes greater than a specified value that is determined in advance.

2. The control apparatus according to claim 1, wherein the electronic control unit is configured to: i) execute a fuel cut of the internal combustion engine when a stop command of the internal combustion engine is issued and when the vehicle is driven with the first transmission method; and ii) change the state of the clutch to disengagement and execute the fuel cut of the internal combustion engine when the stop command of the internal combustion engine is issued and when the vehicle is driven with the second transmission method.

* * * * *